US012441336B2

(12) United States Patent
Schoors et al.

(10) Patent No.: US 12,441,336 B2
(45) Date of Patent: Oct. 14, 2025

(54) FUEL CONSUMPTION PREDICTION SYSTEM AND FUEL CONSUMPTION PREDICTION METHOD

(71) Applicant: BRIDGESTONE CORPORATION, Tokyo (JP)

(72) Inventors: Geert Schoors, Tokyo (JP); David Hensher, Darlington (AU)

(73) Assignee: BRIDGESTONE CORPORATION, Tokyo (JP)

( * ) Notice: Subject to any disclaimer, the term of this patent is extended or adjusted under 35 U.S.C. 154(b) by 72 days.

(21) Appl. No.: 18/564,883

(22) PCT Filed: Mar. 30, 2022

(86) PCT No.: PCT/JP2022/015823
§ 371 (c)(1),
(2) Date: Nov. 28, 2023

(87) PCT Pub. No.: WO2022/270111
PCT Pub. Date: Dec. 29, 2022

(65) Prior Publication Data
US 2024/0286622 A1 Aug. 29, 2024

(30) Foreign Application Priority Data
Jun. 25, 2021 (JP) ................. 2021-106160

(51) Int. Cl.
*B60W 50/00* (2006.01)
*B60W 40/09* (2012.01)
*G01C 21/34* (2006.01)

(52) U.S. Cl.
CPC ........ *B60W 50/0097* (2013.01); *B60W 40/09* (2013.01); *G01C 21/3469* (2013.01)

(58) Field of Classification Search
CPC .............. B60W 50/0097; B60W 40/09; G01C 21/3469; G06Q 10/063; G06Q 50/40; G06Q 10/04; G06Q 10/06
See application file for complete search history.

(56) References Cited

U.S. PATENT DOCUMENTS 6,594,579 B1 7/2003 Lowrey et al.
9,272,712 B2 * 3/2016 Meyer .................... G07C 5/085
(Continued)

FOREIGN PATENT DOCUMENTS

JP 2001-188985 A 7/2001
JP 2009-31046 A 2/2009
(Continued)

OTHER PUBLICATIONS

Extended European search report dated May 15, 2024 in Application No. 22828030.1.
(Continued)

*Primary Examiner* — Phutthiwat Wongwian
*Assistant Examiner* — Sherman D Manley
(74) *Attorney, Agent, or Firm* — Sughrue Mion, PLLC

(57) ABSTRACT

A fuel consumption prediction system predicts the fuel consumption of a vehicle comprising a fleet. The fuel consumption prediction system a driver-related coefficient to be applied to the driver-related explanatory variable and a vehicle-related coefficient to be applied to the vehicle-related explanatory variable based on the actual values of the driver-related explanatory variables and the vehicle-related explanatory variables, and calculates fuel consumption as an objective variable by using the driver related explanatory variables and the vehicle related explanatory variables. The fuel consumption prediction system recalculates a predicted value of the fuel consumption when at least one of the attribute of the driver and the attribute of the vehicle is (Continued)

changed by using the driver-related coefficient and the vehicle-related coefficient.

14 Claims, 13 Drawing Sheets

(56) References Cited

U.S. PATENT DOCUMENTS

| | | | |
|---|---|---|---|
| 11,346,678 B2* | 5/2022 | Trancik | G06Q 10/0631 |
| 11,731,641 B2* | 8/2023 | Ewert | G06V 20/56 |
| | | | 701/23 |
| 2007/0174004 A1* | 7/2007 | Tenzer | G06Q 10/04 |
| | | | 701/123 |
| 2007/0233364 A1 | 10/2007 | Kumar | |
| 2016/0253924 A1* | 9/2016 | Kwak | G07C 5/02 |
| | | | 701/123 |
| 2020/0168012 A1* | 5/2020 | Boss | G07C 5/008 |
| 2021/0129777 A1* | 5/2021 | Van Hoecke | B60W 30/143 |
| 2022/0270413 A1* | 8/2022 | Barnes | G06N 5/01 |
| 2022/0363272 A1* | 11/2022 | Jindal | B60W 40/105 |
| 2023/0196855 A1* | 6/2023 | Bernico | G06N 5/01 |
| | | | 701/33.4 |
| 2024/0265455 A1* | 8/2024 | Raanan | G06Q 40/06 |

FOREIGN PATENT DOCUMENTS

| | | |
|---|---|---|
| JP | 2011-209011 A | 10/2011 |
| JP | 2012-83160 A | 4/2012 |
| JP | 5265567 B2 | 8/2013 |
| JP | 6369542 B2 | 8/2018 |
| KR | 10-1454115 B1 | 10/2014 |
| WO | 2016/071993 A1 | 5/2016 |
| WO | 2021/094911 A1 | 5/2021 |

OTHER PUBLICATIONS

International Search Report for PCT/JP2022/015823, dated Jun. 21, 2022.

* cited by examiner

FIG. 5

| Variable | Aggregation technique |
|---|---|
| Operation/route characteristics: | |
| Average speed (km/hour) | Weighted average by the kilometres driven in each run |
| Kms driven | Per fortnight |
| Average maximum weather temperature (Celsius) | Average of all the days were that bus operated |
| Total number of traffic lights per km | Represents all the bus runs for that period |
| Total number of stops per km | Represents all the bus runs for that period |
| Percent of motorway | Represents all the bus runs for that period |
| Average loading per run (pax) | Weighted average by the kilometres driven in each |
| Average maximum loading per run (pax) | Weighted average by the kilometres driven in each run |
| Percentage kms in AM peak | Represents all the bus runs for that period |
| Percentage kms in-between AM and PM peak periods | Represents all the bus runs for that period |
| Percentage kms in PM peak | Represents all the bus runs for that period |
| Tyre characteristics: | |
| Average tyre temperature (Celsius) | Weighted average by the kilometres driven in each run |
| Average tyre pressure (psi) | Weighted average by the kilometres driven in each run |
| Driver characteristics: | |
| Average age of drivers | Weighted average by the kilometres driven in each run |
| Average experience of drivers | Weighted average by the kilometres driven in each run |
| Percentage of male drivers | Represents all the bus runs for that period |

FIG. 7

| Variables | Mean (standard deviation) | | | | |
|---|---|---|---|---|---|
| Bus type | All fleet | Rigid high floor | Rigid low floor | Articulated/Bendy | Double Decker |
| Percentage of the sample | 100% | 5% | 76% | 16% | 3% |
| Bus characteristics: | | | | | |
| Bus age (years) | 6.61 (4.68) | 18.25 (1.48) | 5.53 (4.25) | 8.85 (0.77) | 5.00 (0.00) |
| Rigid high floor bus body type | 5% | | | | |
| Rigid low floor bus body type | 76% | | | | |
| Articulated/bendy bus body type | 16% | | | | |
| Double decker bus body type | 3% | | | | |
| Capacity (pax) | 77.20 (12.68) | 82.09 (2.47) | 73.13 (8.06) | 86.95 (13.52) | 117.00 (0.00) |
| Operation/route characteristics: | | | | | |
| Fuel consumption (litres/100kms) | 46.26 (8.55) | 40.74 (3.99) | 43.09 (5.00) | 61.36 (5.47) | 54.71 (5.97) |
| Average speed (km/hour) | 28.44 (1.54) | 27.27 (0.79) | 28.69 (1.55) | 27.48 (1.11) | 28.88 (1.17) |
| Kms driven (1,000 km) | 4.10 (2.73) | 1.54 (0.74) | 4.84 (2.69) | 1.82 (0.90) | 1.39 (0.87) |
| Kms driven per fortnight (1,000 km) | 1.63 (0.83) | 0.58 (0.10) | 1.94 (0.70) | 0.67 (0.15) | 0.57 (0.24) |
| Average maximum weather temperature (Celsius) | 20.97 (3.06) | 21.46 (2.36) | 21.06 (3.07) | 20.60 (3.13) | 20.17 (2.81) |
| Number of traffic lights per km | 1.03 (0.11) | 1.02 (0.17) | 1.06 (0.11) | 0.95 (0.07) | 0.95 (0.17) |
| Number of stops per km | 2.27 (0.29) | 2.07 (0.17) | 2.40 (0.16) | 1.82 (0.18) | 1.71 (0.25) |
| Percent of motorway | 8% | 0.09 (0.02) | 0.06 (0.01) | 0.14 (0.02) | 0.15 (0.03) |
| Average loading per run (pax) | 9.61 (2.99) | 10.73 (1.18) | 8.25 (1.30) | 14.37 (2.16) | 16.67 (1.93) |
| Average maximum loading per run (pax) | 21.58 (8.87) | 24.53 (3.14) | 17.25 (2.29) | 37.40 (5.97) | 41.54 (5.41) |
| Percentage kms in AM peak | 35% | 80% | 31% | 40% | 58% |
| Percentage kms in-between AM and PM peak periods | 18% | 2% | 23% | 2% | 0% |
| Percentage kms in PM peak | 37% | 15% | 34% | 56% | 40% |
| Number of routes per 1,000 kms | 14.04 (7.55) | 19.13 (6.39) | 14.12 (7.62) | 12.83 (5.86) | 10.93 (10.29) |
| Tyre characteristics: | | | | | |
| Premium tyre brands | 26% | 33% | 27% | 26% | 17% |
| Mid-level tyre brands | 10% | 0% | 12% | 1% | 0% |
| Budget tyre brands | 64% | 67% | 61% | 72% | 83% |
| Tread depth loss per 1,000 kms (mm) | 0.52 (0.73) | 0.68 (0.63) | 0.42 (0.48) | 0.78 (0.75) | 1.43 (2.42) |
| Proportion tread depth loss per 1,000 kms (mm) | 0.04 (0.06) | 0.05 (0.04) | 0.03 (0.04) | 0.08 (0.07) | 0.11 (0.18) |
| Average tyre temperature (Celsius) | 19.86 (4.61) | 20.76 (2.99) | 19.27 (3.91) | 22.31 (6.60) | 20.52 (5.50) |
| Average tyre pressure (psi) | 105.73 (5.26) | 103.56 (5.37) | 105.52 (5.13) | 107.77 (5.39) | 104.08 (4.63) |

FIG. 8

| Variables | Mean (standard deviation) | | | |
|---|---|---|---|---|
| Optimal level of pressure between 105 and 115 psi (1,0) | 54% | 46% | 51% | 44% |
| Front tyres | 50% | 79% | 44% | 63% |
| Back tyres | 55% | 26% | 55% | 31% |
| Back outer tyre position | 36% | 35% | 35% | 34% |
| Back inner tyre position | 33% | 28% | 33% | 25% |
| Driver characteristics: | | | | |
| Average age of drivers | 51.79 (3.15) | 51.51 (1.92) | 51.57 (2.35) | 51.31 (4.09) |
| Average experience of drivers | 4.41 (1.52) | 3.44 (0.57) | 3.83 (0.82) | 7.31 (1.49) |
| Percentage of male drivers | 84% | 72% | 82% | 83% |
| Number of drivers per 1,000 kms | 8.47 (3.59) | 17.12 (2.19) | 7.80 (1.76) | 8.81 (3.08) | 10.30 (12.09) |
| Number of observations | 1,749 | 79 | 1,335 | 276 | 59 |

FIG. 9  3SLS model results

| Dependent variable: Average Speed (km/hour) | Coefficient | t-test |
|---|---|---|
| Constant | 33.788 | 56.82 |
| Kms driven per fortnight (1,000km) | 0.336 | 8.53 |
| Rigid high floor - average maximum loading per run (pax) | -0.102 | -7.525 |
| Rigid low floor - average maximum loading per run (pax) | -0.394 | -32.662 |
| Articulated/bendy - average maximum loading per run (pax) | -0.117 | -14.707 |
| Double decker - average maximum loading per run (pax) | -0.151 | -6.744 |
| Number of stops per km | -1.403 | -11.08 |
| Proportion of motorway | 18.115 | 12.28 |
| Double decker bus type (1,0) | 3.013 | 2.94 |
| Rigid low floor bus type (1,0) | 5.807 | 15.80 |
| Average drivers' years working | 0.155 | 5.95 |
| Average drivers' age | -0.062 | -8.65 |
| Proportion of kms driven by a male driver | 0.559 | 2.70 |
| Number of drivers per 1,000 kms | -0.046 | -4.96 |
| Dependent variable: Average Tyre Temperature (Celsius) | Coefficient | t-test |
| Constant | -13.368 | -9.37 |
| Average speed (km/hour) | 0.212 | 4.87 |
| Proportion kms in AM or PM peak | 1.830 | 3.71 |
| Rigid high floor - average maximum loading per run (pax) | 0.049 | 3.963 |
| Articulated/bendy - average maximum loading per run (pax) | 0.079 | 14.070 |
| Double decker - average maximum loading per run (pax) | 0.043 | 5.006 |
| Average maximum weather temperature (Celsius) | 1.126 | 59.70 |
| Outer back tyre position (1,0) | 1.274 | 9.06 |
| Inner back tyre position (1,0) | 3.667 | 25.56 |
| Dependent variable: Proportion of Tread Depth Loss per 1,000 kms | Coefficient | t-test |
| Constant | -0.52262 | 15.51 |
| Average tyre temperature (Celsius) | 0.00110 | 4.17 |
| Average speed (km/hour) | 0.01236 | 13.58 |
| Average maximum loading per run (pax) | 0.00269 | 16.95 |
| Front tyres - Optimal level of pressure between 105 and 115 psi (1, 0) | 0.00594 | 1.50 |
| Number of drivers per 1,000 kms | 0.00374 | 10.09 |
| Number of routes per 1,000 kms | 0.00371 | 22.29 |
| Number of traffic lights per km Number | 0.03931 | 3.62 |
| Outer back tyre position (1,0) | 0.01504 | 4.50 |
| Inner back tyre position (1,0) | 0.01906 | 5.34 |
| October (1,0) | 0.01810 | 2.72 |
| Dependent variable: Fuel Consumption (litres/100kms) | Coefficient | t-test |
| Constant | 30.372 | 31.20 |
| Proportion of Tread Depth Loss per 1,000 kms | 6.117 | 3.16 |
| Kms driven per fortnight (1,000km) | -0.801 | -3.25 |
| Bus age (years) | 0.576 | 14.87 |
| Rigid low floor bus type (1,0) | 10.878 | 17.667 |
| Articulated/bendy bus type (1,0) | 25.964 | 39.739 |
| Double decker bus type (1,0) | 21.225 | 23.496 |

FIG. 10

| Scenario | | Base | Simulated scenarios | | | | | | |
| --- | --- | --- | --- | --- | --- | --- | --- | --- | --- |
| | | | 1 | 2 | 3 | 4 | 5 | 6 | 7 |
| Explanatory variables | Percentage of tyres with optimal level of pressure | 54.17 | 90.00 | | | | | | |
| | Average bus age | 6.73 | | 5.00 | 5.00 | 5.00 | 5.00 | 5.00 | 5.00 |
| | Average drivers' age (years) | 51.86 | | | 55.00 | 55.00 | 55.00 | 55.00 | |
| | Average drivers' experience (years) | 4.42 | | | | 3.00 | 3.00 | 3.00 | 3.00 |
| | Percent male drivers | 84.50 | | | | | 50.00 | 50.00 | 50.00 |
| | Number of drivers per 1,000 kms | 8.61 | | | | | | 6.00 | 6.00 |
| Predicted change in dependent variables | Average speed (km/hour) | 28.41 | 28.41 | 28.41 | 28.22 | 27.99 | 27.80 | 27.92 | 27.92 |
| | Average tyre temperature (Celsius) | 20.04 | 20.04 | 20.04 | 20.00 | 19.95 | 19.91 | 19.94 | 19.94 |
| | Percentage of tread depth loss per 1,000kms | 4.68 | 4.61 | 4.68 | 4.43 | 4.15 | 3.91 | 3.09 | 3.02 |
| | Fuel consumption (litres/100km) | 46.44 | 46.43 | 45.44 | 45.42 | 45.41 | 45.39 | 45.34 | 45.34 |

FIG. 11

Descriptive profile of maintenance costs dataset (per vehicle-RTD) Dollars are AUD$2019

| Variable | Mean (standard deviation) |
|---|---|
| Costs | |
| Total maintenance costs per km (AUD$) | 0.47(0.56) |
| Total tyre services cost per km (AUD$) | 0.12(0.28) |
| Total chassis services cost per km (AUD$) | 0.18(0.33) |
| Total body services cost per km (AUD$) | 0.13(0.27) |
| Total interior services cost per km (AUD$) | 0.04(0.06) |
| Total routine services cost per km (AUD$) | 0.14(0.17) |
| Percentage of observations with no total maintenance costs | 2% |
| Percentage of observations with no tyre services cost | 31% |
| Percentage of observations with no chassis services cost | 15% |
| Percentage of observations with no body services cost | 29% |
| Percentage of observations with no interior services cost | 26% |
| Percentage of observations with no routine services cost | 34% |
| Other variables in the model | |
| Proportion of tread depth loss per 1,000 kms | 0.0446(0.04) |
| Average tyre temperature (Celsius) | 20.13(4.23) |
| Bus age (years) | 6.75(4.83) |
| Number of drivers per 1,000 kms | 8.29(2.86) |
| Number of routes per 1,000 kms | 14.15(7.79) |
| Number of drivers per route | 0.67(0.22) |
| Rigid low floor bus type (1,0) | 76% |
| Articulated/bendy bus type (1,0) | 15% |
| Rigid high floor bus type (1,0) | 5% |
| Double decker bus type (1,0) | 4% |
| Number of observations | 234 |

FIG. 12

Maintenance cost model results

| Dependent variable:Total maintenance cost per kms (AUD$) | Coefficient | t-test |
|---|---|---|
| Constant | −0.48863 | −2.42 |
| Proportion o ftread depth loss per 1,000 kms | 1.90542 | 1.78 |
| Average tyre temperature (Celsius) | 0.01740 | 1.96 |
| Bus age | 0.03762 | 4.43 |
| Number of drivers per route | 0.44288 | 2.54 |
| Rigid high floor bus type (1,0) | −0.68874 | −3.48 |

FIG. 13

| Reset to current levels | | All types | | Base Scenario | Articulated/bendy bus type | | |
|---|---|---|---|---|---|---|---|
| Proportion of Types | | | | 1.57 | ˅ | | 14.71% |
| Kms driven per fortnight (1,000km) | ˅ | | ˄ | 37.39 | Rigid low floor bus type | | |
| Average maximum loading per run (pax) – Bendy | ˅ | | ˄ | 17.39 | ˅ | | 75.21% |
| Average maximum loading per run (pax) – Rigid Low | ˅ | | ˄ | 40.55 | Double decker bus type | | |
| Average maximum loading per run (pax) – Double Deck | ˅ | | ˄ | 23.88 | ˅ | | 5.46% |
| Average maximum loading per run (pax) – Rigid High | ˅ | | ˄ | 1.03 | Rigid high floor bus type | | |
| Total number of traffic lights per km | ˅ | | ˄ | 2.25 | | | 4.62% |
| Total number of stops per km | ˅ | | ˄ | 7.71% | | | |
| Proportion of motorway | ˅ | | ˄ | 73.40% | | | |
| Proportion kms in AM or PM peak | ˅ | | ˄ | 21.16 | | | |
| Average maximum weather temperature (Celsius) | ˅ | | ˄ | 54.17% | | | |
| Front tyres – Optimal level of pressure (105 – 115 psi) | ˅ | | ˄ | 35.23% | | | |
| Back outer tyre position | ˅ | | ˄ | 32.20% | | | |
| Back inner tyre position | ˅ | | ˄ | 32.57% | | | |
| Front type position | ˅ | | ˄ | 6.73 | | | |
| Bus Age (year) | ˅ | | ˄ | 4.42 | | | |
| Average drivers' years working in FCL | ˅ | | ˄ | 51.86 | | | |
| Average drivers' age | ˅ | | ˄ | 84.50% | | | |
| Proportion of kms driven by a male driver | ˅ | | ˄ | 8.61 | | | |
| Number of drivers per 1,000 kms | ˅ | | ˄ | 14.47 | | | |
| Number of routes per 1,000 kms | ˅ | | ˄ | 28.41 | Unobserved influences* | | |
| Average Speed (km/hour) – Scenario | | 28.41 | | 20.04 | ˅ | | ˄ |
| Average Tyre Temperature (Celsius) | | 20.04 | | 4.68% | ˅ | | ˄ |
| Proportion of Tread Depth Loss per 1,000 kms (PTDL) | | 4.30% | | 46.44 | ˅ | | ˄ |
| Fuel Consumption (litres/100kms) | | 46.41 | | | ˅ | | ˄ |

FUEL CONSUMPTION PREDICTION SYSTEM AND FUEL CONSUMPTION PREDICTION METHOD

CROSS REFERENCE TO RELATED APPLICATIONS

This application is a National Stage of International Application No. PCT/JP2022/015823 filed Mar. 30, 2022, claiming priority based on Japanese Patent Application No. 2021-106160 filed Jun. 25, 2021.

TECHNICAL FIELD

This disclosure relates to a fuel consumption prediction system and a fuel consumption prediction method for predicting the fuel consumption of vehicles comprising a fleet.

BACKGROUND ART

Conventionally, there is known a demand forecasting system for consumables (For example, a tire) for a fleet composed of a plurality of vehicles (e.g. buses and trucks) owned by a transportation company or the like (Patent Literature 1).

The demand prediction system described in the Patent Literature 1 calculates the degree of deterioration of consumables and predicts the type and quantity of consumables required in a vehicle (auto.) mechanic factory. Thus, the maintenance cost of the fleet can be reduced.

PRIOR ART DOCUMENTS

Patent Literature

[PTL 1] WO 2016/071993

SUMMARY OF INVENTION

Problem to be Solved by the Invention

For a fleet comprising of multiple vehicles, it is important to control fuel consumption in order to achieve efficient operation, in addition to the maintenance costs as described above.

Accordingly, the following disclosure has been made in view of this situation, and is intended to provide a fuel consumption prediction system and a fuel consumption prediction method that can contribute to the reduction of fuel consumption of vehicles comprising a fleet.

One aspect of the present disclosure is a fuel consumption prediction system (Fleet management system 10) that predicts the fuel consumption of a vehicle comprising a fleet, including a driver-related variable acquisition unit (Driver related variable acquisition unit 110) for acquiring a plurality of driver-related explanatory variables related to attributes of a driver who drives the vehicle, a vehicle-related variable acquisition unit (Vehicle related variable acquisition unit 120) for acquiring a plurality of vehicle-related explanatory variables related to attributes of the vehicle, a coefficient setting unit (Coefficient setting unit 140) for setting a driver-related coefficient to be applied to the driver-related explanatory variable and a vehicle-related coefficient to be applied to the vehicle-related explanatory variable based on actual values of the driver-related explanatory variables and the vehicle-related explanatory variables, and an objective variable calculation unit (Objective variable calculation unit 150) that calculates fuel consumption as an objective variable by using the driver related explanatory variables and the vehicle related explanatory variables. The objective variable calculation unit recalculates a predicted value of the fuel consumption when at least one of the attribute of the driver and the attribute of the vehicle is changed by using the driver-related coefficient and the vehicle-related coefficient.

One aspect of the present disclosure is a fuel consumption prediction method for predicting the fuel consumption of a vehicle comprising a fleet and the fuel consumption prediction method including the steps of acquiring a plurality of driver-related explanatory variables related to attributes of a driver who drives the vehicle, acquiring a plurality of vehicle-related explanatory variables related to attributes of the vehicle, setting a driver-related coefficient applied to the driver-related explanatory variable and a vehicle-related coefficient applied to the vehicle-related explanatory variable based on actual values of the driver-related explanatory variables and the vehicle-related explanatory variables, and calculating the fuel consumption as an objective variable using the driver-related explanatory variables and the vehicle-related explanatory variables. In the step of calculating the objective variable, a predicted value of the fuel consumption is recalculated when at least one of the attribute of the driver and the attribute of the vehicle is changed by using the driver-related coefficient and the vehicle-related coefficient.

One aspect of the present disclosure is a tire wear prediction system that predicts the wear of tires mounted on a vehicle comprising a fleet, including a driver-related variable acquisition unit (Driver related variable acquisition unit 110) for acquiring a plurality of driver-related explanatory variables related to attributes of a driver driving the vehicle, a vehicle-related variable acquisition unit (Vehicle related variable acquisition unit 120) for acquiring a plurality of vehicle-related explanatory variables related to attributes of the vehicle, a coefficient setting unit (Coefficient setting unit 140) for setting a driver-related coefficient to be applied to the driver-related explanatory variable and a vehicle-related coefficient to be applied to the vehicle-related explanatory variable based on actual values of the driver-related explanatory variables and the vehicle-related explanatory variables, and an objective variable calculation unit (Objective variable calculation unit 150) for calculating the wear as an objective variable by using the driver-related explanatory variables and the vehicle related explanatory variables. The objective variable calculation unit recalculate a predicted value of the wear when at least one of the attribute of the driver and the attribute of the vehicle is changed by using the driver-related coefficient and the vehicle-related coefficient.

One aspect of the present disclosure is a tire wear prediction method for predicting wear of a tire mounted on a vehicle comprising a fleet and the tire wear prediction method comprising the steps of acquiring a plurality of driver-related explanatory variables related to attributes of a driver driving the vehicle, acquiring a plurality of vehicle-related explanatory variables related to attributes of the vehicle, setting a driver-related coefficient applied to the driver-related explanatory variable and a vehicle-related coefficient applied to the vehicle-related explanatory variable based on actual values of the driver-related explanatory variables and the vehicle-related explanatory variables, calculating the wear as an objective variable by using the driver-related explanatory variables and the vehicle-related explanatory variables. In the step of calculating the objective variable, the predicted value of the wear is recalculated when at least one of the attribute of the driver and the attribute of the vehicle is changed by using the driver-related coefficient and the vehicle-related coefficient.

BRIEF DESCRIPTION OF DRAWINGS

FIG. 5 is a diagram illustrating an aggregated example of fleet operation, tire, and driver characteristics.

FIG. 7 is an example of a descriptive profile of a typical variable (Data).

FIG. 8 is an example of a descriptive profile of a typical variable (Data).

FIG. 9 shows the results of the 3SLS model.

FIG. 10 shows an example of a simulated scenario.

FIG. 11 is a diagram showing a descriptive profile of a maintenance cost data set.

FIG. 12 shows the results of the maintenance cost model.

FIG. 13 is a diagram showing an example of a simulation scenario using the DSS tool of the 3SLS model.

DESCRIPTION OF EMBODIMENTS

Figure 1:
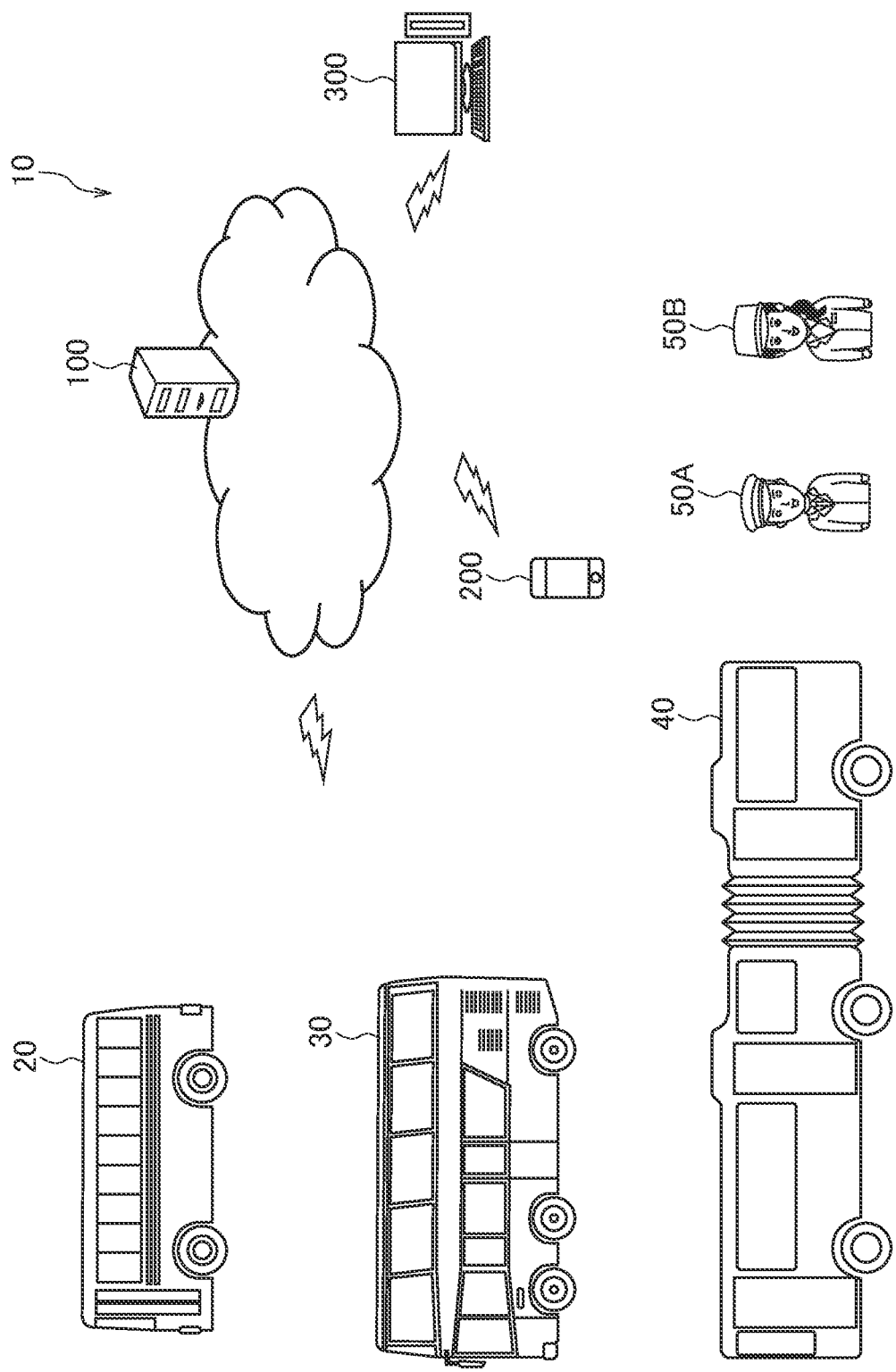
FIG. 1 is an overall schematic diagram of a fleet and fleet management system 10.

Hereinafter, an embodiment will be described based on the drawings. It should be noted that the same or similar reference numerals are given to the same functions and structures, and the description thereof will be omitted as appropriate.

(1) Overall Schematic Configuration of Fleet and Fleet Management System

FIG. 1 is an overall schematic diagram of a fleet and fleet management system 10. The fleet management system 10 manages a fleet, specifically, multiple vehicles.

In this embodiment, the fleet management system 10 manages a plurality of buses that comprise a fleet. As shown in FIG. 1, a fleet comprises multiple types of buses (Vehicle).

Specifically, fleet may include regular buses 20, double-decker buses 30, and articulated buses 40.

The regular bus 20 is typically a 1-floor rigid bus with a low floor or a high floor. In this embodiment, the regular bus 20 has 1 front wheel axle and 1 rear wheel axle.

The double-decker bus 30 has a double-decker structure having a 1st floor and a 2nd floor. In this embodiment, the double-decker bus 30 has 2 front wheel axles and 1 rear wheel axle.

The articulated bus 40 has a structure in which two vehicle bodies are jointed. The articulated bus 40 may also be referred to as a bendy bus. In this embodiment, the articulated bus 40 has 1 front wheel axle and 1 rear wheel axle of the leading vehicle as well as one axle of the rear vehicle.

The regular bus 20, the double-decker bus 30 and the articulated bus 40 may be provided as route buses or as chartered buses.

The regular bus 20, the double-decker bus 30 and the articulated bus 40 are driven by drivers of a bus operating company that manages the fleet. Specifically, the bus is driven by a male driver 50 A and a female driver 50 B. The bus operating company includes a plurality of male drivers 50 A and a plurality of female drivers 50 B. The age structure and the years of driving experience of the drivers may vary.

The fleet management system 10 may provide multiple functions for fleet management. In the present embodiment, a fuel consumption prediction system for predicting fuel consumption of a vehicle (Bus) comprising the fleet and a tire wear prediction system for predicting wear of a tire mounted on the vehicle (Bus) comprising the fleet can be configured.

Such fuel consumption and tire wear prediction systems may be provided as a decision support system (DSS) to support decision-making in an entity (Bus operating companies, etc.) operating the fleet. Such a DSS may provide some guidance regarding the tire-related impact on the fuel consumption and maintenance costs of the fleet. The details of the DSS will be described later.

The fleet management system 10 may include a server computer 100, a portable terminal 200, and a desktop terminal 300.

The server computer 100 can execute a computer program for realizing a fuel consumption prediction system and a tire wear prediction system. The server computer 100 may be constituted by a single server computer connected to a communication network or may be virtually constituted on a network cloud.

A network cloud typically includes the Internet and includes various information providing services (Weather information, etc.), storage services, and application services provided on the Internet.

The portable terminal 200 and the desktop terminal 300 can access the server computer 100 through a communication network.

The portable terminal 200 is typically a smartphone, a tablet type terminal or the like, but may be a laptop type personal computer (PC). The desktop terminal 300 may be a relatively large PC (Including monitor) set up in an office or the like of the entity operating a fleet.

The portable terminal 200 and the desktop terminal 300 are used for inputting data to the server computer 100 (Fuel consumption prediction system and tire wear prediction system), displaying, outputting etc. a processing result in the server computer 100.

The fuel consumption prediction system and the tire wear prediction system handle a wide range of data, and generally, data related to a vehicle (Bus type, etc.), a tire related measurement (Tread remaining groove amount, temperature, internal pressure, etc.), a weather (Temperature, etc.), a travel (Distance, fuel consumption, etc.), a driver (Gender, age, years of driving experience, etc.), and a road (Operating routes, number of traffic signals, number of bus stops, etc.) may be used.

Further, a part of these data may not be acquired through the portable terminal 200 or the desktop terminal 300, but for example, the tire related measurement data may be acquired through a telemetry system using a tire air pressure monitoring system (TPMS) or the like, and the weather data and the like may be acquired directly by the server computer 100 through a communication network.

(2) Functional Block Configuration of Fleet Management System

Next, a functional block configuration of the fleet management system 10 will be described. Specifically, the functional block configuration of the fuel consumption prediction system and the tire wear prediction system realized by the server computer 100 will be described.

Figure 2:
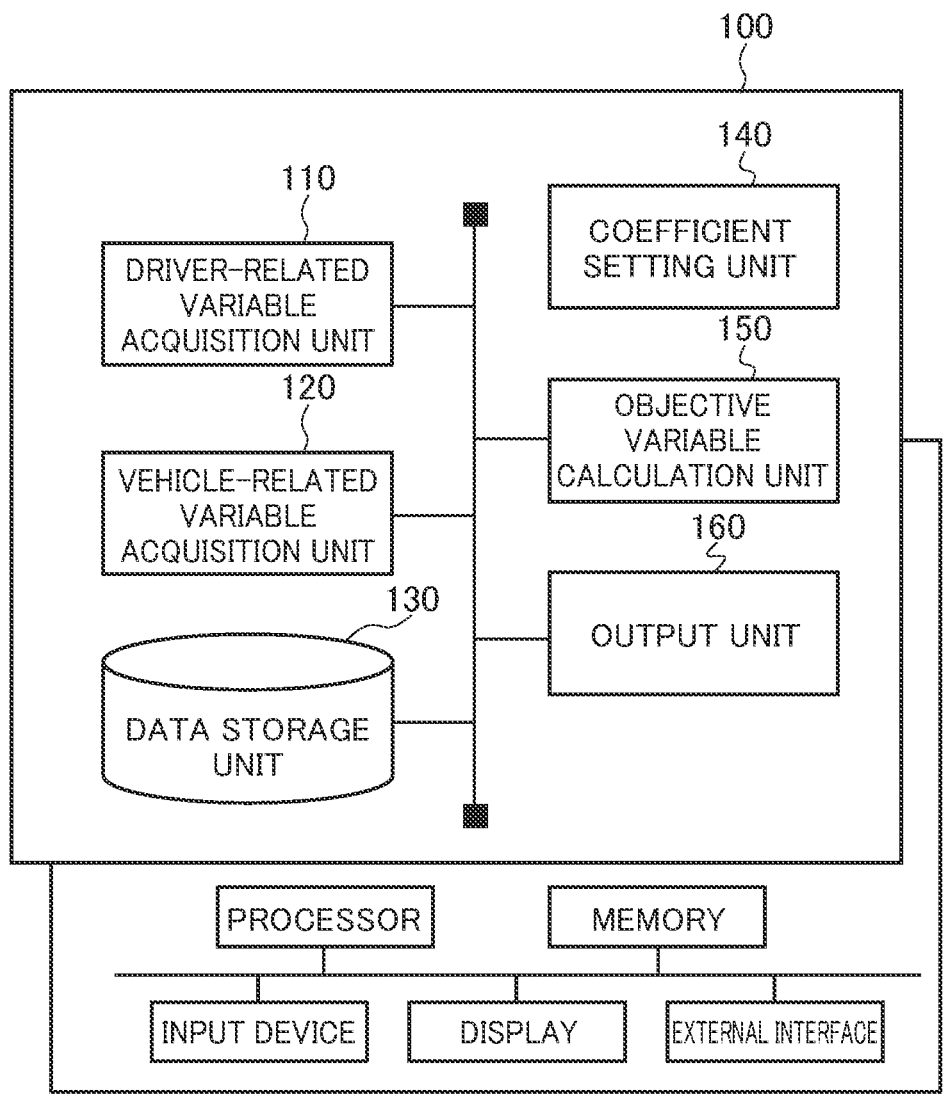
FIG. 2 is a functional block diagram of the server computer 100.

FIG. 2 is a functional block diagram of the server computer 100. As shown in FIG. 2, the server computer 100 includes a driver-related variable acquisition unit 110, a vehicle-related variable acquisition unit 120, a data storage unit 130, a coefficient setting unit 140, an objective variable calculation unit 150, and an output unit 160.

These functional blocks are implemented by executing a computer program (Software) on the hardware of the server computer 100.

Specifically, the server computer 100 may include, as hardware elements, a processor, memory, an input device, a display, an external interface, and the like. However, as described above, the server computer 100 (Fuel consumption prediction system and tire wear prediction system) may be configured virtually on a network cloud.

The fuel consumption prediction system predicts the fuel consumption of the vehicles (Bus) that comprise the fleet. The tire wear prediction system also predicts wear of a tire mounted on the vehicles (Bus) comprise the fleet.

The driver-related variable acquisition unit 110 can acquire a plurality of driver-related explanatory variables. The driver-related explanatory variable may be defined as a variable related to attributes of a driver who drives a vehicle (Bus).

In the present embodiment, the driver-related explanatory variables are variables relating to the attributes of a plurality of male drivers 50 A and female drivers 50 B who drive the regular bus 20, the double-decker bus 30, or the articulated bus 40.

These variables may be interpreted as an explanatory variable. The explanatory variable may be defined as a variable for explaining the objective (response) variable and may be called an independent variable. The explanatory variable may be selected from the data described above.

The objective variable may be defined as the variable to be predicted, and may be called a dependent variable.

The driver-related variable acquisition unit 110 can acquire, as the driver-related explanatory variable, at least one of the average age, gender ratio, average years of experience, and number of persons per predetermined mileage of the drivers. The gender ratio may mean the ratio of male (or female) drivers to the total. The number of persons per predetermined mileage (Number of drivers per 1,000 kms) means the number of persons in charge of drivers per predetermined mileage (For example, 1,000 km).

The driver-related explanatory variable is not limited to such a variable, and further statistical data (e.g., record of accidents, blood type, etc.) related to the attribute of the driver may be added.

The vehicle-related variable acquisition unit 120 can acquire a plurality of vehicle-related explanatory variables related to attributes of the vehicle (Bus). Vehicle-related explanatory variable may be defined as a variable related to the attribute of vehicle (Bus).

In the present embodiment, the vehicle-related explanatory variable is a variable relating to an attribute of the regular bus 20, the double-decker bus 30, or the articulated bus 40.

Like driver-related explanatory variables, the variable may be interpreted as an explanatory variable.

The vehicle-related variable acquisition unit 120 can acquire, as the vehicle-related explanatory variable, a wearing speed of the tires mounted on the vehicle (Bus). The wearing speed may be defined as the amount of tread wear per unit distance of the tires mounted on each bus. Alternatively, the wearing speed may be defined as the amount of tread wear per unit travel time of the bus. The wearing speed may also be defined as the amount of remaining grooves in the tread (RTD: Remaining Tread Depth).

The vehicle-related variable acquisition unit 120 can acquire, as the vehicle-related explanatory variable, an average speed of the vehicle (Bus). Average speed (velocity) may be defined as the average speed of the bus per route traveled.

Alternatively, the average speed may be defined as the average speed per unit operating time of the bus.

Further, the vehicle-related variable acquisition unit 120 can acquire, as the vehicle-related explanatory variable, the average temperature of the tires (average tire temperature) mounted on the vehicle (Bus). The average temperature may be defined as the average of the temperatures measured more than once for the tires mounted on each bus. The temperature may be measured by a TPMS sensor mounted on the inner surface or the like of the tire, as described above. The temperature may be acquired when the bus starts, stops, or during the operation, but it is desirable that the temperature is not acquired while the bus is parked and not in service.

The data storage unit 130 stores data acquired by the driver-related variable acquisition unit 110 and the vehicle-related variable acquisition unit 120. The data storage unit 130 stores data (Variable) that is input through the portable terminal 200 or the desktop terminal 300 and handled by the fuel consumption prediction system and the tire wear prediction system.

The coefficient setting unit 140 sets a coefficient to be applied to the driver-related explanatory variable acquired by the driver-related variable acquisition unit 110. The coefficient setting unit 140 sets a coefficient to be applied to the vehicle-related explanatory variable acquired by the vehicle-related variable acquisition unit 120.

Specifically, the coefficient setting unit 140 sets a driver-related coefficient to be applied to the driver-related explanatory variable. The coefficient setting unit 140 sets a vehicle-related coefficient to be applied to the vehicle-related explanatory variable.

More specifically, the coefficient setting unit 140 can set the driver-related coefficient and the vehicle-related coefficient based on the actual values of the driver-related explanatory variable and the vehicle-related explanatory variable.

The actual values of the driver related explanatory variable and the vehicle related explanatory variable are numerical values determined based on the past numerical values of the driver related explanatory variable acquired by the driver related variable acquisition unit 110 and the past numerical values of the vehicle related explanatory variable acquired by the vehicle related variable acquisition unit 120.

The driver-related coefficient can be set for each driver-related explanatory variable. The vehicle-related coefficient can be set for each vehicle-related explanatory variable. Note that a common (identical) coefficient may be set for some of all the explanatory variables. Such coefficients may also be replaced by terms such as weighting or parameters.

In the present embodiment, the driver-related coefficient and the vehicle-related coefficient can be estimated using a 3-stage least-squares (3 SLS) model. However, it is not necessary to use the 3SLS model, and other SLS models may be used.

Specific examples of driver-related explanatory variables, vehicle-related explanatory variables, driver-related coefficients, and vehicle-related coefficients will be described later.

The objective variable calculation unit 150 calculates the objective variable by using the driver-related explanatory variable and the vehicle-related explanatory variable.

Specifically, the objective variable calculation unit 150 can calculate the fuel consumption as the objective variable by using the driver-related explanatory variable and the vehicle-related explanatory variable. The fuel consumption is a fuel consumption rate (or consumption amount) that is assumed to be consumed when the vehicle, specifically, the regular bus 20, the double-decker bus 30, or the articulated bus 40 travels along a predetermined traveling route according to predetermined conditions.

More specifically, the objective variable calculation unit 150 can estimate the fuel consumption that changes when the coefficient is changed by adjusting at least one of the coefficients (driver-related coefficient or vehicle-related coefficient) of the driver-related explanatory variable and the vehicle-related explanatory variable that affect the fuel consumption.

That is, the objective variable calculation unit 150 can set the weighting (Parameter) of each explanatory variable based on the past results of the fuel consumption as the objective variable, the driver attribute (Average age, gender ratio, average years of experience, etc.) as the explanatory variable that affects the fuel consumption, and the vehicle information (years of use, vehicle type). Furthermore, the objective variable calculation unit 150 can recalculate the predicted value of the objective variable when the driver attribute and/or vehicle information is changed.

The objective variable calculation unit 150 can calculate the wear of tire (tire wear) as the objective variable by using the driver-related explanatory variable and the vehicle-related explanatory variable. The tire wear is the amount of wear (or RTD) in the tread of a tire mounted on the regular bus 20, double-decker bus 30, or articulated bus 40. Alternatively, the tire wear referred to herein may be a wearing speed as described above.

Specifically, the objective variable calculation unit 150 can estimate wear that changes when the coefficient is changed by adjusting at least one of the coefficients (driver-related coefficient or vehicle-related coefficient) of driver-related explanatory variables and vehicle-related explanatory variables that affect wear.

That is, the objective variable calculation unit 150 can set the weighting of each explanatory variable (Parameter) on the basis of the past results of the waring speed (Amount of wear per constant mileage) as the objective variable, the driver attribute (Average age, gender ratio, average years of experience, etc.) as an explanatory variable affecting the waring speed, and the vehicle information (years of use, vehicle type). Furthermore, the objective variable calculation unit 150 can recalculate the predicted value of the objective variable when the driver attribute and/or vehicle information is changed.

In this manner, the objective variable calculation unit 150 can recalculate the predicted value of the fuel consumption when at least one of the attributes of the driver and the vehicle is changed by using the driver-related coefficient and the vehicle-related coefficient.

Further, the objective variable calculation unit 150 can recalculate a predicted value of tire wear when at least one of the attributes of driver and vehicle is changed by using the driver-related coefficient and the vehicle-related coefficient.

The output unit 160 can output the data (explanatory variable) acquired by the driver-related variable acquisition unit 110 and the vehicle-related variable acquisition unit 120.

The output unit 160 can output the driver-related coefficient and the vehicle-related coefficient set by the coefficient setting unit 140.

Further, the output unit 160 can output predicted values of fuel consumption and tire wear calculated by the objective variable calculation unit 150.

Specifically, the output unit 160 provides functions of outputting image data to a display or the like and transmitting data to the portable terminal 200 or the desktop terminal 300.

The output unit 160 may display, transmit, or output the data described above via a platform of a decision support system (DSS).

(3) Operation of the Fleet Management System

Operation of the fleet management system 10 will now be described. Specifically, the predictive operation of the fleet management system 10 (Fuel consumption prediction system) for fuel consumption of vehicles (Bus) comprising a fleet and the predictive operation of the fleet management system 10 (Tire wear prediction system) for wear of tires mounted on vehicles (Bus) comprising a fleet will be mainly described.

(3.1) Overall Operation Outline

Figure 3:
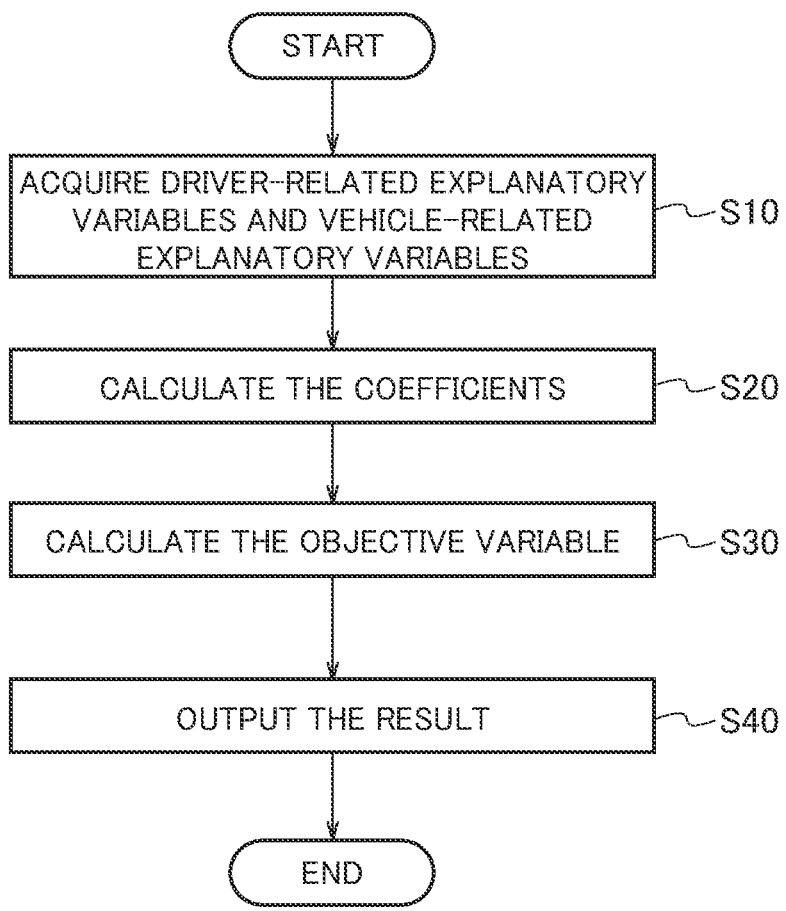
FIG. 3 illustrates the overall schematic operational flow of fleet management system 10.

FIG. 3 shows an overall schematic operational flow of the fleet management system 10. Specifically, the operation flow shown in FIG. 3 is common to the fuel consumption prediction system and the tire wear prediction system.

As shown in FIG. 3, the fleet management system 10 acquires driver-related explanatory variables and vehicle-related explanatory variables (S 10).

Specifically, the fleet management system 10 acquires the explanatory variables related to the attributes of the driver driving the vehicle (Bus) and acquires the explanatory variables related to the attributes of the vehicle (Bus).

The fleet management system 10 calculates the coefficients that apply to the acquired driver-related explanatory variables and vehicle-related explanatory variables (S 20). Specifically, fleet management system 10 calculates a driver-related coefficient applied to a driver-related explanatory variable and a vehicle-related coefficient applied to a vehicle-related explanatory variable.

More specifically, the fleet management system 10 uses a 3-step least squares (3 SLS) model to calculate (estimate) the driver-related coefficient and the vehicle-related coefficient, as described above.

The fleet management system 10 calculates the objective (response) variable by using the driver-related explanatory variable and the vehicle-related explanatory variable (S 30).

Specifically, the fleet management system 10 may use driver-related explanatory variables and vehicle-related explanatory variables to calculate fuel consumption as the objective variable. Similarly, the fleet management system 10 may calculate tire wear as the objective variable using driver-related and vehicle-related explanatory variables.

In addition, the fleet management system 10 may recalculate the predicted fuel consumption using driver-related coefficient and vehicle-related coefficient if at least one of the driver and vehicle attributes is changed. Similarly, the fleet management system 10 may recalculate the predicted tire wear using driver-related coefficient and vehicle-related coefficient to if at least one of the driver and vehicle attributes is changed.

The fleet management system 10 outputs the result of recalculation of the predicted fuel consumption value and/or the result of recalculation of the predicted tire wear (S 40). In particular, the fleet management system 10 may display the results on a display unit or send them to the portable terminal 200 or the desktop terminal 300.

(3.2) Collected Data

In the fleet management system 10 (Fuel consumption prediction system and tire wear prediction system), the following data are collected as driver-related explanatory variables and vehicle-related explanatory variables in order to calculate predicted values for fuel consumption and tire wear.

(3.2.1) Vehicle (Bus)

As described above, the type of bus may be one of the regular bus 20, the double-decker bus 30, and the articulated bus 40. The ratio of each bus is not particularly limited, but generally, the ratio of the regular bus 20 may be high.

Figure 4:
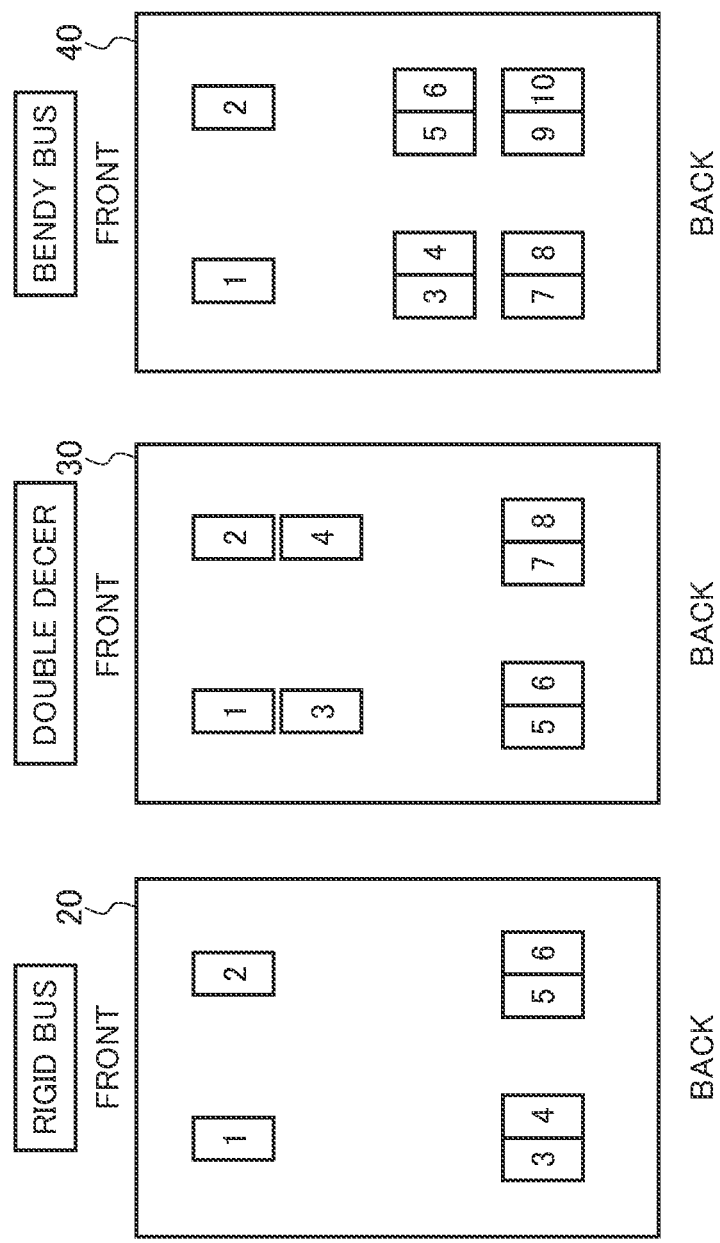
FIG. 4 is a diagram showing tire positions for each type of bus.

FIG. 4 shows the tire positions for each bus type. As shown in FIG. 4, the regular bus 20 has 1 front wheel axle and 1 rear wheel axle. In the rear wheel of a regular bus 20, a so-called double tire in which 2 tires are assembled in parallel is adopted, and 6 tires of 1-6 are mounted.

The double-decker bus 30 has 2 front wheel axles and 1 rear wheel axle. In a double-decker bus 30, a double tire is adopted for a rear wheel, and 8 tires of 1-8 are mounted.

The articulated bus 40 has one front wheel axle and one rear wheel axle of the leading vehicle as well as one axle of the rear vehicle. Double tires are also adopted for the articulated bus 40, and 10 tires of 1-10 are mounted.

The number of buses and the number of tires are not particularly limited, but in order to improve the prediction accuracy of fuel consumption and tire wear, it is preferable that a modulus of a certain degree or more exists, and the total number of buses is approximately 30 or more and the number of tires is approximately 200 or more.

The fleet management system 10 can also acquire detailed trip record (By unique vehicle ID) data for each bus from an external system (Services) connected via a communications network.

The data may include travel routes associated with the number of bus seated/standing capacity, number of trips by day, number of passengers in each trip, each route with direction for each time of day. Each bus for each vehicle trip also may have unique driver ID to link with the driver experience profile.

These data provide variables at a per vehicle ID level: number of runs (trips), average number of passengers per trip, bus seated capacity, average speed by trip, and time zone (times of day (TOD), for example, six times a day).

The data may include a service (Maintenance) history for each vehicle. The service history may include the following items:

Service Groups
Date when the service took place
Number of labor hours
Cost of each service
Service Type
Odometer at the time the vehicle had a service
Description for each record of service The service type and cost may be counted and aggregated by the RTD of each vehicle.

The service group may include, for example, the following services.

Tire-related service: tire flat, tire worn, retread, pressure monitoring, mechanic work such as tire retention wheel nuts, circuit protection valve.

Chassis-related service: brake, breakdown, electrical, engine, cooling/heating, steering, urea water (AdBlue (registered trademark)) filter, etc.

Body-related service: air conditioning, body damage, maintenance, repair, ticket machine, etc.

Interior-related service: mirror, glass, window, windscreen, CCTV, steam clean, etc.

Routine service: routine service, inspection (RMS), pre-RMS inspection.

(3.2.2) Remaining Tread Depth (RTD)

As for the remaining tread depth (RTD) of the tire tread, different tread depths exist at different positions on the surface of the tire (tread), and different measured values can exist along the circumference of the tire.

However, since the difference between the measured values does not have a large effect, the RTD may be measured at only one point along the circumference of the tire. On the other hand, in the tire width direction, it is desirable to measure a plurality of points (For example, 3-4 points) in consideration of the fact that the outer edge is liable to wear and the inner edge is also subject to uneven wear from time to time. Measurements may be made manually or with automatic tools.

The amount of wear (residual groove quantity) of the tread of the tire may be defined as follows.

$$TreadLoss = \text{(current date tread depth)} - \text{(previous date tread depth)}$$

The tread depth may be interpreted as the depth of the main grooves formed in the tread.

The tire temperature and air pressure (internal pressure) can be measured by sensors attached to each tire associated with the vehicle ID and tire position (See FIG. 4) of the bus. The average temperature and the average internal pressure may be based on measurements collected at two consecutive RTD measurement timings.

(3.2.3) Fuel Consumption

The fuel consumption may be a weighted average by distance travelled (wL100 km). Specifically, for each measurement interval of RTD, "service kilometer" (service distance) may be used to calculate wL100 km.

The fuel consumption data may be obtained, for example, on a monthly basis, and the tread wear amount (TreadLoss) and other primary variables may be aggregated in the period in which a specific TreadLoss occurs.

The service kilometer for weighting may be calculated for each sub-period obtained by splitting monthly periods of fuel data by RTD periods.

(3.2.4) Roads and Routes

Data on the number of traffic signals and major rotary (roundabout) may be included for the road on which each bus follows the route of operation. The number of signals may include the number of signals and mini-rotary. An intersection may also include a large roundabout with a road centerline diameter greater than 15 meters.

The road conditions may also be quantified by the length of each type of road function, road surfaces, the number of lanes, etc., based on the road segment data set.

(3.2.5) Tire Related

In addition to the RTD described above, tracking data (record) after tire removal or tire fitted may be included. For example, when a tire is removed or replaced, data concerning the tire may be recorded. The data may include the vehicle ID (of the bus having its tire replaced), position of the tire replaced, the tire brand name, date of tire replacement, retread depth, tire ID (Date+vehicle ID+tire position), the condition of each fitted tire (New or retreaded (regeneration)), the number of retreads, etc.

(3.2.6) Driver Information Profile

For the driver information profile, data such as employee ID (Driver ID), gender, date of birth, and hire date may be included. The data can be associated with each vehicle and each tire by combining them with customer data (patronage data) to obtain driver experience during the periods when tire tread depth loss occurs.

The driving experience and driving profile calculated from this stage may also include the number of trips, service kilometers, average speed and number of passengers, aggregated by RTD (Time a tread loss occurs for each tire).

(3.2.7) Weather Data

For weather, weather data may include the area where the base (bus parking lot) of operating the fleet (bus operator) is located. For example, the maximum temperature for each month may be included, or the average temperature for a period consistent with the measurement interval of the RTD may be included. The data may include weather (Clear, cloudy, rainy, and snowy).

(3.3) Data Aggregation

In the fleet management system 10 (Fuel consumption prediction system and tire wear prediction system), one of the most important variables is the tread depth loss measured as the change in tread depth over a time period of two measurement timings. The period may be called the measuring period (interval) of tread depth for that period. The measurement period is not particularly limited, but is usually about 10 to 130 days.

There are some variables that remain constant during these periods (or almost constant), such as bus age, bus type, tire brands, bus fuel consumption, which do not generate any issue.

On the other hand, variables such as average speed, routes, bus patronage, weather temperature, tire temperature and air pressure (internal pressure), etc. may vary during a measurement period of tread depth.

All variables are preferably aggregated to represent a tread measurement period. FIG. 5 shows an example of the aggregation of the characteristics of the fleet operation, tires, and drivers.

As shown in FIG. 5, the operation/route characteristics include average speed, mileage (kms driven, per fortnight), average maximum weather temperature, etc. The data are aggregated by an appropriate method such as a weighted average.

The tire characteristics include an average temperature and an average internal pressure. Driver characteristics include average age, average years of experience, and percentage of female drivers.

In the case where the operation route is long, the characteristic may be weighted higher than that of the short operation route. The distance travelled (kms) during the measuring period of the tread may be in units of 2 weeks (fortnight). For example, if one measurement period is 15 days and another measurement period is 50 days, it is meaningless to directly compare the distances travelled by the buses.

(3.4) Speed, Temperature, Tread Depth and Fuel Consumption Models

Description will now be made of the speed, temperature, tread depth and fuel consumption models.

(3.4.1) Simultaneous Equations Model System

The statistical method according to the present embodiment can use a jointly estimated 3-stage least squares (3 SLS) model (a system of equations with left hand side (LHS) and right hand side (RHS) endogenous variables).

As described above, while tread depth loss between two measurement timings (Points) is important, the number of observations will depend on how many consistent data points that can be collected from the same tire.

The four models relate to the average speed, average tire temperature, tread depth loss, and fuel consumption. The tread depth loss by itself is not highly informative as it will be highly dependent on the number of kilometers that the vehicle ran during the measurement period, and millimeter change will not have the same effect on tires with different tread depths.

Thus, a tread depth transformed variable representing the proportion of tread depth loss per 1 kilometer (tread wear per km) relative to the previous tread depth is used. This transformation is shown in (Equation 1).

[Expression 1]

$$PropTreadDepthLoss/km_{tyre} = \frac{(TreadDepth_t)/(TreadDepth_{t-1})}{OdometreReading_t - OdometreReading_{t-1}} \quad (1)$$

The unit of the variable is as follows.

$$\left[\frac{mm/mm}{kms} = \frac{1}{kms}\right] \quad \text{[Expression 2]}$$

All the attributes included in the following equations are calculated based on the tread measurement period. For example, the travel distance (kilometers driven) means the service travel distance (kilometers) that each bus has driven between the previous measurement and the present time.

The system of equations is as shown in (Equation 2)-(Equation 5).

[Expression 3]

$$\text{Average Speed}_{bus\,driver} = \quad (2)$$
$$\beta_0 + \beta_1 \cdot DriverAge_{driver} + \beta_2 \cdot DriverExperience_{driver} +$$
$$\beta_3 \cdot \#Drivers_{bus} + \beta_4 \cdot Kms_{bus} + \sum_i \beta_i \cdot RoadCharacteristics_{bus} +$$
$$\sum_l \beta_l \cdot BusTypes_{bus} \cdot MaxPatronage_{bus} + \sum_j \beta_j \cdot BusTypes_{bus}$$

[Expression 4]

$$AverageTemperature_{tyre} = \beta_0 + \beta_1 \cdot AverageSpeed_{bus} + \quad (3)$$
$$\beta_2 \cdot WeatherTemperature + \beta_3 \cdot ProportionKmsPeak_{bus} +$$
$$\sum_i \beta_i \cdot BusTypes_{bus} \cdot MaxPatronage_{bus} + \sum_j \beta_j \cdot TyrePosition_{tyre}$$

[Expression 5]

$$PropTreadDepthLoss/km_{bus} = \beta_0 + \beta_1 \cdot AverageTemperature_{tyre} + \quad (4)$$
$$\beta_2 \cdot \text{Average Speed}_{bus} + \beta_3 \cdot MaxPatronage_{bus} + \beta_4 \cdot \#Drivers_{bus} +$$
$$\sum_i \beta_i \cdot RoadCharacteristics_{bus} + \sum_j \beta_j \cdot TyrePosition_{tyre} +$$
$$\sum_m \beta_m \cdot Month + \sum_l \beta_l \cdot TyrePressure_{tyre} \cdot TyrePosition_{tyre}$$

-continued

[Expression 6]

$$FuelConsumption_{bus} = \tag{5}$$
$$\beta_0 + \beta_1 \cdot \% \ TreadDepthLoss/km_{tyre} + \beta_2 \cdot Kms_{bus} + \beta_3 \cdot VehAge_{bus} +$$
$$\sum_i \beta_i \cdot BusTypes_{bus} \cdot MaxPatronage_{bus} + \sum_j \beta_j \cdot BusTypes_{bus}$$

Figure 6:
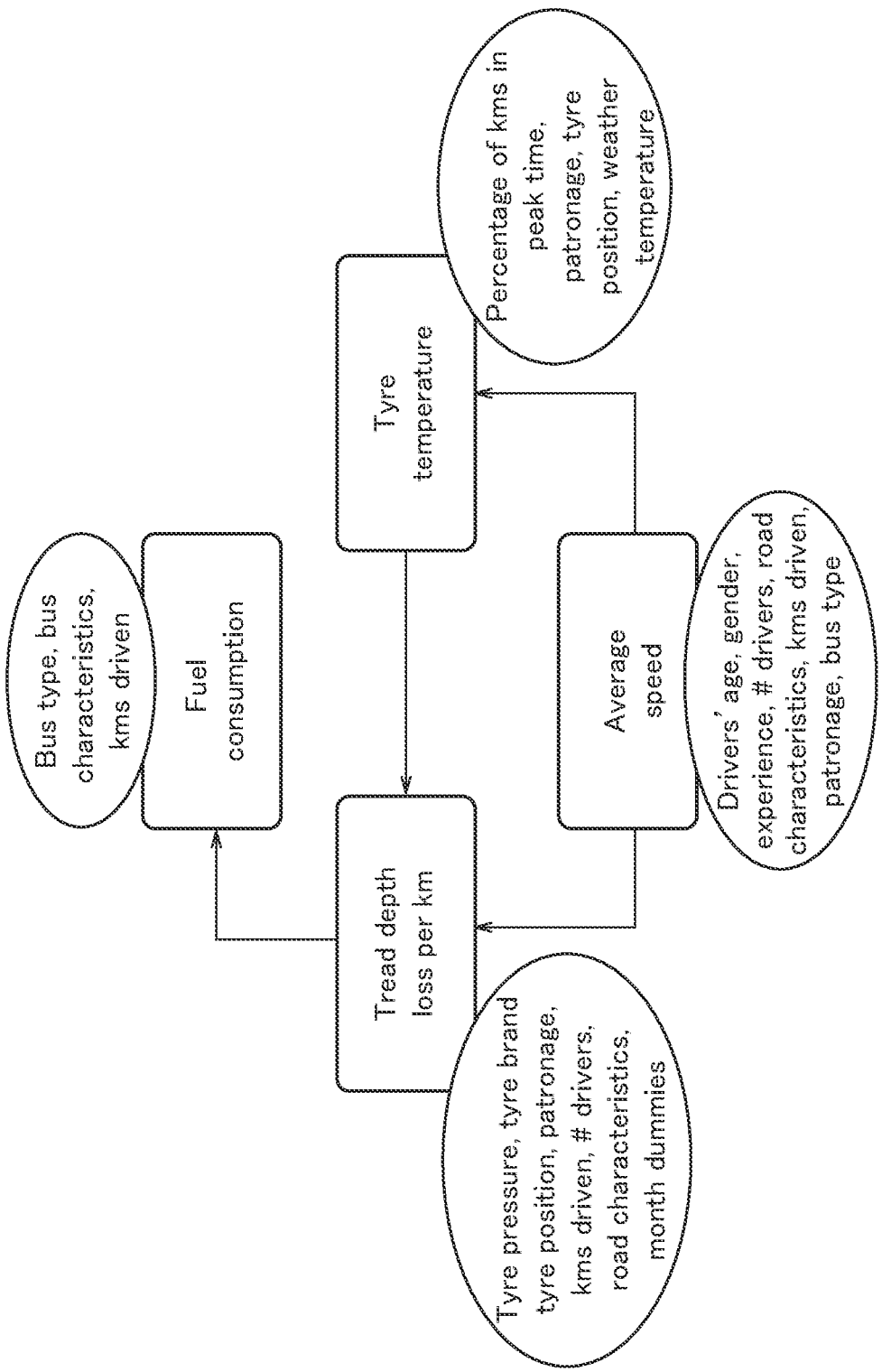
FIG. 6 is a diagram showing the relationship between the variables.

FIG. 6 shows the relationship between the variables. Fuel consumption is explained in part by tire tread depth loss (Tread depth loss per km), in part by tire temperature, and in part by average speed.

A portion of the tire temperature is described by the average speed.

Each of these endogenous variables is influenced by a number of the exogenous factors shown in the circles in FIG. 6. Although the exogenous factors included in each of the models shown in FIG. 6 are examples illustratively, the combinations of interactions associated with variables vary, as shown by the equations described above.

As shown in FIG. 6, when disturbances (error terms) are contemporaneously correlated, a feasible generalized least squares (FGLS) version of the two-stage least squares estimation leads to a consistent and asymptotically efficient estimation (Zellner and Theil 1962). This estimation procedure is called three-stage least squares (3 SLS).

Zellner's 3SLS estimator is obtained by first regressing all variables on the right-hand side of each equation on all the variables in the list of (exogenous) instruments and retaining the fitted values.

In the event, this first-stage regression produces a perfect fit with a parameter of one on that variable and zeros for all others, so any variable in the equation list that also appears in the instrumental variable list is exactly reproduced.

After estimation, the disturbance covariance matrix is estimated using the original variables, not the fitted variable. Non-iterated 3SLS is used since iterating does not bring gains in efficiency and does not produce a maximum likelihood estimation result.

(3.4.2) Descriptive Profile of Date Collected

FIGS. 7 and 8 are examples of descriptive profiles of typical variables (Data). As shown in FIGS. 7 and 8, in an example of final data of statistical and descriptive analysis of a 3SLS model, there are 1,749 observed values, each representing one tire.

The numerical values shown in FIGS. 7 and 8 are mean (standard deviation), and the numerical values are shown separately for each bus type (All, high-floor buses, low-floor buses, articulated/Bendy buses and double-decker buses).

Further, the variables are divided into bus characteristics, operation/route characteristics, tire characteristics and driver characteristics.

(3.4.3) Results and Interpretation of 3SLS Model

As described above, in this embodiment, 3SLS model is used, but there are average speeds, tread depth losses, average tire temperatures, and fuel consumption that can have a statistically significant effect on each of the endogenous variables.

The (Equation 2) dependent (or left-hand side) variable is the average speed and is statistically explained by several route, operation and bus characteristics.

The dependent variable of the (Equation 3) is the average tire temperature, which is statistically explained by the average speed, proportion of kilometers in peak-hour, passenger (patronage), weather temperature and tire position.

The dependent variable of (Equation 4) is the tread depth loss, which is statistically explained by average speed, average tire temperature, tire pressure in front tires, distance travelled (kms driven), route characteristics, passenger and tire position.

The dependent variable of the (Equation 5) is the fuel consumption and is influenced in a statistically significant way by tread depth loss, bus age, distance travelled (kms driven) and bus type.

FIG. 9 shows the results of the 3SLS model. FIG. 9 shows a coefficient parameter and a t value (t-test) of each dependent variable.

The results shown in FIG. 9 suggest that the average speeds of the double-decker bus 30 and the low-floor regular (Rigid) bus 20 are higher than those of other types of buses (articulated bus 40 and high-floor regular bus 20).

Rear wheel (back) tires have a greater tread depth loss than expected front wheel tires. Inside rear wheel (inner back) tires lost more tread depth per 1,000 km than outside rear wheel (outer back) tires (3.7% versus 1.3%).

The articulated bus 40 consumes much more fuel than other types of buses, followed by the double-decker bus 30.

Importantly, many of the statistically significant explanatory variables are contextual and represent the operating environment, and therefore are not under operator control. In all 4 inter-related equations (Equations 2 through 5), the variables under operator control (That is, a variable that is capable of changing its value) are the driver (Years of experience, age, and number of drivers), tire pressure, tire temperature, bus age and bus type.

Also, in the equation of average speed (Expression 2), since all other conditions are the same, it is understood that buses that were driven for more kilometers per fortnight tend to have a higher average speed. The more stops per kilometer the lower the average speed.

Furthermore, as the maximum loading per travel (run) increases, the speed decreases (take longer to load and unload). The maximum load for each travel varies with the type of bus. The low-floor regular bus 20 is greatly influenced by the maximum load, and the followed by the double-decker bus 30 and the articulated bus 40.

Drivers that have been working for a longer periods in a bus company tend to have higher average speed. Older drivers also tend to have lower average speeds, and male drivers tend to have higher average speeds. This is mainly related to the route of operation.

Interestingly, it has been shown that many drivers tend to drive one vehicle (Per 1,000 km) for longer periods of time, resulting in lower average speeds. This may be related to familiarity with vehicles and routes, and the average speed will decrease if not familiar.

The same applies to periods of time when tire temperatures may rise during peak driving (Congestion effects and greater braking), when there are many passengers, and when weather temperatures are expected to be high.

The maximum load has a greater influence on the tire temperature of the articulated bus 40, followed by the high-floor regular bus 20 and the double-decker bus 30, it did not show a statistically significant influence for the low-floor regular bus 20.

When the average tire temperature increases, the tread depth loss increases, and when the average speed increases, the tread depth loss increases. Interestingly, the optimal air pressure level seems to be a statistically significant influence on the tread depth loss (Reducing the level to 105-115 psi) of the front tire. This suggests that the optimum level of air pressure does not have a statistically significant influence on the tread depth loss for the back tire. This may be due to the influence of other variables.

Clearly, an improvement in tread depth loss can contribute significantly to savings in fuel through improved fuel efficiency. There may be opportunities to improve tread depth losses, but usually other variables such as average speed are not under the control of the bus operator, except for driving ability, which varies with driver experience and age.

(3.5) Maintenance Costs Implications

Vehicle (Bus) maintenance costs include all inventory (include the cost of tires) and labor, taking into account tire services, chassis services, body services, interior services and routine services.

FIG. 11 shows a descriptive profile of a maintenance cost data set. The total cost of maintenance per kilometer includes both labor and inventory costs for each item. Australian dollars (AUD) are used as the currency unit.

The tread depth loss used in the model represents the average for all the tires on the vehicle. As shown in FIG. 11, it occurs in various cost components of the total maintenance cost.

Thus, all costs are summed and expressed as maintenance costs per kilometer, using them as dependent variables, and the maintenance score model is explained by other candidate operations, operating routes, and other variables. The linear regression equation is as follows.

[Expression 7]

$$MaintenanceCosts_{bus} = \\ \beta_0 + \beta_2 \cdot Average\left(\%\frac{TreadDepthLoss}{km_{tyre}}\right)_{bus} + \beta_2 \cdot AverageTemp_{bus} + \\ \beta_3 \cdot BusAge_{bus} + \beta_4 \cdot \#DriversPerRoure_{bus} + \sum_i \beta_i \cdot BusTypes_{bus} \quad (6)$$

FIG. 12 shows the results of the maintenance cost model. The main variables related to the influences on tire performance that explain sources of variation in total maintenance costs are as follows:

Average proportion of tread depth loss for all tires on the vehicle average tire temperature bus age Number of drivers per route per vehicle Dummy variable representing the high-floor regular bus 20

It can be confirmed that there is a link between loss of tire tread depth and total maintenance costs.

(3.6) Decision Support System (DSS)

Decision support systems (DSS) can provide guidance on several important influences, with a specific interest in tire-related influences, fuel consumption and maintenance costs. The DSS allows the user to change the level of the explanatory variable (within an acceptable and behaviorally realistic range) and the DSS automatically calculates the impact on all other affected variables.

Since DSS includes all the relationships shown in FIG. 6, for example, a change in the average drivers' age will influence average speed and the proportion of tire temperature and tread depth loss. The tread depth loss also has an effect on fuel consumption.

Thus, a change in one explanatory variable (Such as average speed), although not included in all four equations, can influence all four endogenous dependent variables (e.g., average speed is not a direct explanatory variable in the fuel consumption model, but have an effect through tread depth loss.).

Further, the DSS allows for changes in the dependent variables (i.e., average speed, average tire temperature, proportion of tread depth loss, and fuel consumption) through adjusting the constant coefficients (see FIG. 9) on the assumption that all other explanatory variables are not changed.

That is, the numerical values of the driver-related coefficient and the vehicle-related coefficient may be adjusted on the assumption that all other explanatory variables are not changed.

As described above, although several explanatory variables are included in the 3SLS model, not all of them can be controlled by the operator. Various scenarios are simulated to clarify the impact of these variables on fuel consumption and maintenance cost savings.

The scenario can be simulated by changing five explanatory variables which are considered to be controllable by the operator. Specifically, this is the percentage of tires with the optimal internal pressure level (105-115 psi), bus age, the average drivers' age, average drivers' experience, percentage of male drivers 50 A, number of drivers, and number of drivers per driving route.

FIG. 10 shows an example of a simulated scenarios. Specifically, FIG. 10 shows six different simulated scenarios together with the base (Current situation), showing the impact that they are predicted to have on the four endogenous (i.e., dependent variables (Average speed, average tire temperature, proportion of tread depth loss per 1,000 km and fuel consumption).

In scenario 1, the percentage of tires at an optimal internal pressure level (105-115 psi) increases from 54.17% to 90.00%. DSS may indicate the fuel consumption savings (amount) for the scenario (The same is true for scenario 2-7).

In scenario 2, the bus age is reduced from 6.73 to 5 years.

Scenario 3 maintains the improved bus age in Scenario 2 and increases the average drivers' age to 55 years.

Scenario 4 maintains the improved explanatory variables in Scenario 3 and decreases the drivers' experience to 3 years.

In scenario 5, the level of scenario 4 is maintained, but 50% of the kilometers are driven by female drivers 50 B.

Scenario 6 is added to the level of Scenario 5 and reduces the number of drivers per 1,000 km for each vehicle to 6 (Basic scenario is 8.61 people).

Also, in terms of maintenance costs, all changes can directly or indirectly influence maintenance costs through changes in the proportion of tread depth loss and average tire temperature.

As described in Scenario 2, the explanatory variable, bus age has a significant influence on maintenance costs. As in Scenario 2, reducing the bus age from 6.73 to 5 years can save annual maintenance costs. All simulated scenarios show a similar effect in the 3SLS and maintenance cost models.

Scenario 7 is a model in which both fuel and maintenance costs are significantly reduced.

FIG. 13 shows an example of a simulation scenario using a 3SLS model DSS tool. Specifically, FIG. 13 shows an example of a screenshot of a simulation scenario using the DSS tool for the 3SLS model.

The savings in fuel consumption may be translated into monetary savings in fuel consumption. For example, fuel costs an average of $1.61 (AUD) per liter, and taking into account fuel credits of $0.12003 per liter, annual savings are $1.49 per liter.

Also, for example, the total annual operating distance provided by the subject fleet is assumed to be a predetermined value, but the DSS tool may be used to change the total annual operating distance provided by the subject fleet.

(4) Function and Effects

According to the embodiment described above, the following effects can be obtained. Specifically, the fleet management system 10 (Fuel consumption prediction system) can set driver-related coefficients and vehicle-related coefficients based on the actual values of driver-related explanatory variables and vehicle-related explanatory variables. The fuel consumption prediction system (Specifically, DSS) can recalculate the predicted value of fuel consumption when at least one of the attribute of the driver and the attribute of vehicle is changed by using the driver-related coefficient and the vehicle-related coefficient.

In other words, it is possible to present a method for fleet management by focusing on variables that can be controlled by the operator (bus operator), "driver attribute" and "vehicle attribute" and recalculating fuel consumption when these variables are changed.

The prediction accuracy can be improved by using the tire wearing speed, the average speed of the vehicle, and the average tire temperature as explanatory variables of the fuel consumption.

Also, the fleet management system 10 (Tire wear prediction system) can use driver-related coefficient and vehicle-related coefficient to recalculate the predicted value of tire wear when at least one of the attribute of the driver and the attribute of the vehicle (Bus) is changed.

In other words, it is possible to present a method for fleet management by focusing on variables that can be controlled by the operator (bus operator), "driver attribute" and "vehicle attribute" and recalculating the wearing speed (tread depth loss) when these variables are changed.

The prediction accuracy can be improved by using the average speed of the vehicle and the average tire temperature as explanatory variables of the wearing speed.

That is, the fuel consumption prediction system may contribute to the reduction of fuel consumption of the buses comprising the fleet. The tire wear prediction system can more accurately predict wear of a tire mounted on a bus constituting the fleet.

In this embodiment, the fleet management system 10 can acquire at least one of an average age, a gender ratio, an average years of experience, and the number of persons per predetermined mileage of the driver as the driver-related explanatory variable. Therefore, the fuel consumption and the tire wear can be predicted with higher accuracy by using the driver-related explanatory variable having a large influence on the fuel consumption or the wearing speed.

In this embodiment, fleet management system 10 may acquire as vehicle-related explanatory variables the average speed of the bus, the wearing speed of tires mounted on the bus (For fuel consumption prediction systems), and the average temperature of tires mounted on the bus. Therefore, the fuel consumption and the tire wear can be predicted with higher accuracy by using the vehicle-related explanatory variable having a large influence on the fuel consumption or the wearing speed.

(5) Other Embodiments

Although the embodiment has been described above, it is obvious to a person skilled in the art that various modifications and improvements are possible without being limited to the description of the embodiment.

For example, in the above-described embodiment, the driver-related explanatory variables are mainly the average age, gender ratio, average years of experience, and number of persons per predetermined mileage of the driver, but the driver-related explanatory variables are not limited to these explanatory variables, and other explanatory variables shown in FIGS. 7 and 8 may be used.

Further, in the above-described embodiment, as the vehicle-related explanatory variable, the tire wearing speed, the average speed of the vehicle, and the average tire temperature are used, but the vehicle-related explanatory variable is not limited to these explanatory variables, and other explanatory variables shown in FIGS. 7 and 8 may be used.

While the disclosure has been described in detail above, it will be apparent to those skilled in the art that the disclosure is not limited to the embodiments described herein. The disclosure may be embodied in modifications and variations without departing from the spirit and scope of the disclosure as defined by the description of the claims. Accordingly, the description of the present disclosure is for illustrative purposes only and has no restrictive meaning in relation to the present disclosure.

SIGN DESCRIPTION

10 Fleet management system
20 Regular bus
30. Double-decker buses
40 Articulated bus
50 A Male driver
50 B Female driver
100 Server computer
110 Driver-related variable acquisition unit
120 Vehicle-related variable acquisition unit
130 Data storage unit
140 Coefficient setting unit
150 Objective variable calculation unit
160 Output unit
200 Portable terminal
300 Desktop terminal

The invention claimed is:

1. A fuel consumption prediction system that predicts the fuel consumption of a vehicle comprising a fleet, comprising:
a driver-related variable acquisition unit for acquiring a plurality of driver-related explanatory variables related to attributes of a driver who drives the vehicle;
a vehicle-related variable acquisition unit for acquiring a plurality of vehicle-related explanatory variables related to attributes of the vehicle;
a coefficient setting unit for setting a driver-related coefficient to be applied to the driver-related explanatory variable and a vehicle-related coefficient to be applied to the vehicle-related explanatory variable based on actual values of the driver-related explanatory variables and the vehicle-related explanatory variables; and
an objective variable calculation unit that calculates fuel consumption as an objective variable by using the driver related explanatory variables and the vehicle related explanatory variables, wherein the objective variable calculation unit:
estimates, by adjusting at least one of the driver-related coefficient of the driver related explanatory variable that affects the fuel consumption or the vehicle-related coefficient of the vehicle-related explanatory variable that affects the fuel consumption, the fuel consumption that changes when the at least one of the driver-related coefficient or the vehicle-related coefficient is changed; and recalculates a predicted value of the fuel consumption when at least one attribute of the driver or attribute of the vehicle is changed by using the driver-related coefficient and the vehicle-related coefficient.

2. The fuel consumption prediction system according to claim 1, wherein the driver related variable acquisition unit acquires, as the driver related explanatory variable, at least one of an average age, a gender ratio, an average years of experience, and a number of persons per predetermined mileage of the driver.

3. The fuel consumption prediction system according to claim 1, wherein the vehicle-related variable acquisition unit acquires, as the vehicle-related explanatory variable, a wearing speed of the tire mounted on the vehicle.

4. The fuel consumption prediction system according to claim 1, wherein the vehicle-related variable acquisition unit acquires, as the vehicle-related explanatory variable, an average speed of the vehicle.

5. The fuel consumption prediction system according to claim 1, wherein the vehicle-related variable acquisition unit acquires an average temperature of tires mounted on the vehicle as the vehicle-related explanatory variable.

6. A fuel consumption prediction method for predicting the fuel consumption of a vehicle comprising a fleet, the fuel consumption prediction method comprising the steps of:

acquiring a plurality of driver-related explanatory variables related to attributes of a driver who drives the vehicle;

acquiring a plurality of vehicle-related explanatory variables related to the attribute of the vehicle;

setting a driver-related coefficient applied to the driver-related explanatory variable and a vehicle-related coefficient applied to the vehicle-related explanatory variable based on actual values of the driver-related explanatory variables and the vehicle-related explanatory variables; and calculating the fuel consumption as an objective variable using the driver-related explanatory variables and the vehicle-related explanatory variables, wherein in the step of calculating the objective variable;

by adjusting at least one of the driver-related coefficient of the driver-related explanatory variable that affects the fuel consumption or the vehicle-related coefficient of the vehicle-related explanatory variable that affects the fuel consumption, the fuel consumption, which changes when the at least one of the driver-related coefficient or the vehicle-related coefficient is changed, is estimated; and a predicted value of the fuel consumption is recalculated when at least one attribute of the driver or attribute of the vehicle is changed by using the driver-related coefficient and the vehicle-related coefficient.

7. The fuel consumption prediction system according to claim 2, wherein the vehicle-related variable acquisition unit acquires, as the vehicle-related explanatory variable, a wearing speed of the tire mounted on the vehicle.

8. The fuel consumption prediction system according to claim 2, wherein the vehicle-related variable acquisition unit acquires, as the vehicle-related explanatory variable, an average speed of the vehicle.

9. The fuel consumption prediction system according to claim 3, wherein the vehicle-related variable acquisition unit acquires, as the vehicle-related explanatory variable, an average speed of the vehicle.

10. The fuel consumption prediction system according to claim 2, wherein the vehicle-related variable acquisition unit acquires an average temperature of tires mounted on the vehicle as the vehicle-related explanatory variable.

11. The fuel consumption prediction system according to claim 3, wherein the vehicle-related variable acquisition unit acquires an average temperature of tires mounted on the vehicle as the vehicle-related explanatory variable.

12. The fuel consumption prediction system according to claim 4, wherein the vehicle-related variable acquisition unit acquires an average temperature of tires mounted on the vehicle as the vehicle-related explanatory variable.

13. The fuel consumption prediction system according to claim 1, wherein the objective variable calculation unit estimates, by adjusting at least one of the driver-related coefficient of the driver related explanatory variable that affects a tire wear or the vehicle-related coefficient of the vehicle-related explanatory variable that affects the tire wear, the tire wear that changes when the at least one of the driver-related coefficient or the vehicle-related coefficient is changed.

14. The fuel consumption prediction method according to claim 6, wherein a tire wear is estimated by adjusting at least one of the driver-related coefficient of the driver related explanatory variable that affects the tire wear or the vehicle-related coefficient of the vehicle-related explanatory variable that affects the tire wear, the tire wear changing when the at least one of the driver-related coefficient or the vehicle-related coefficient is changed.

* * * * *